Figure 2:
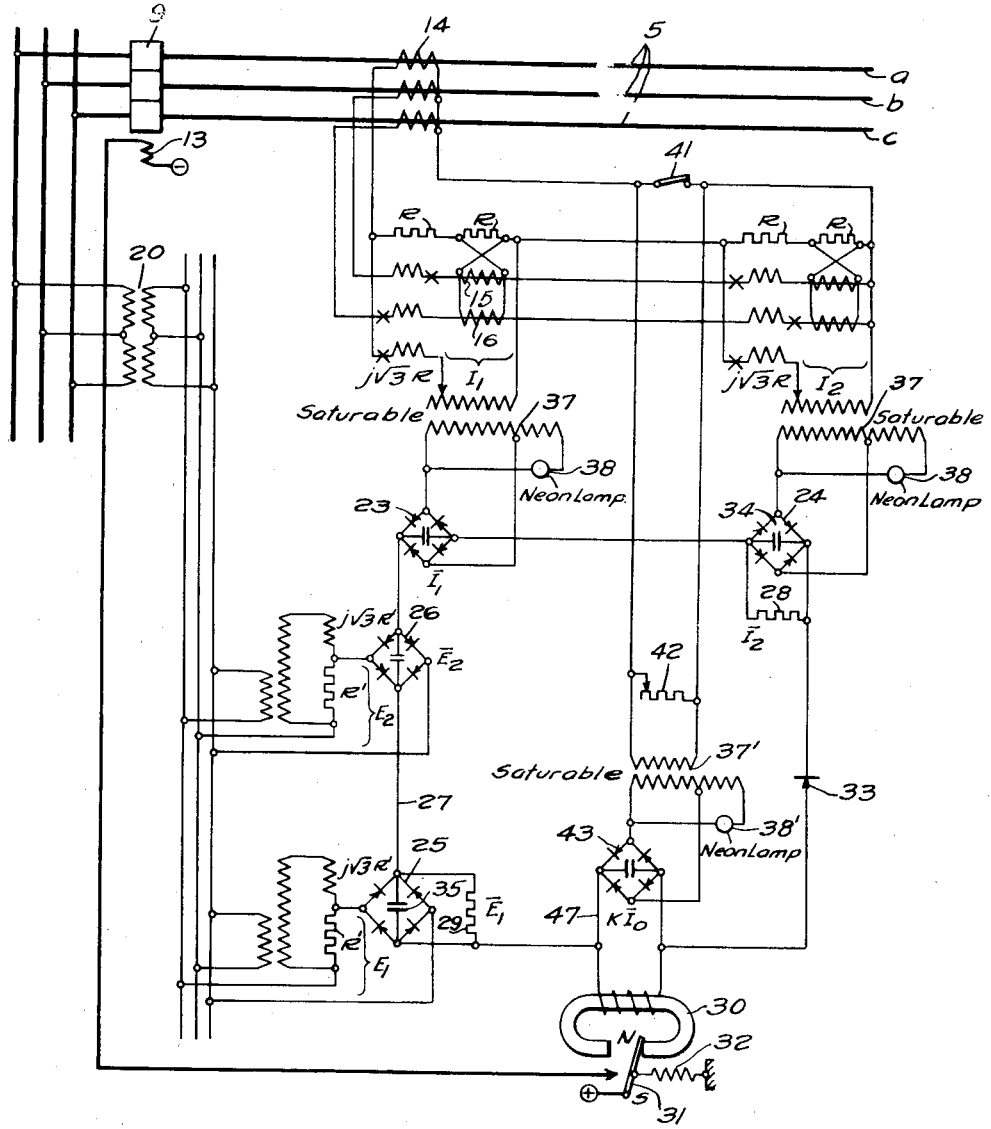

May 20, 1941.  E. L. HARDER  2,242,951
PROTECTIVE RELAYING EQUIPMENT
Filed Nov. 12, 1938  2 Sheets—Sheet 1
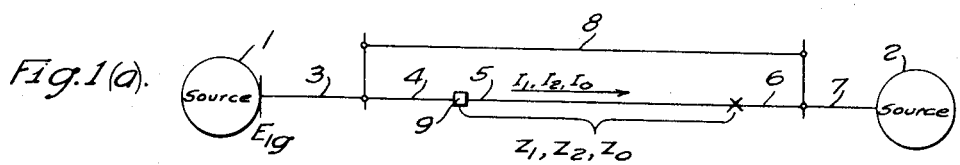
Fig. 1(a).
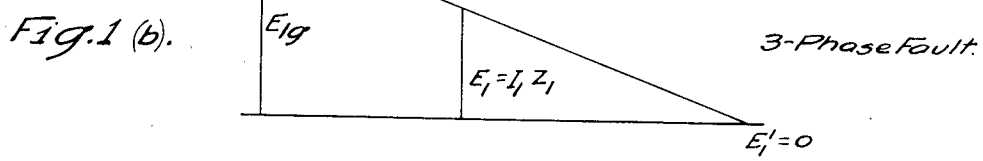
Fig. 1(b). 3-Phase Fault.
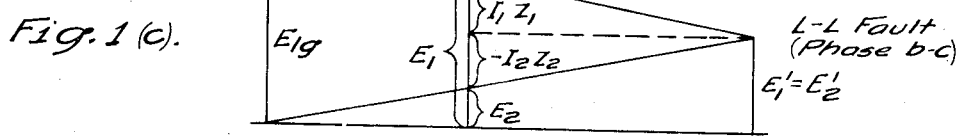
Fig. 1(c). L-L Fault (Phase b-c)
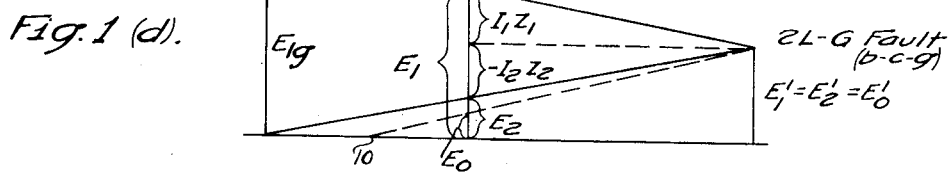
Fig. 1(d). 2L-G Fault (b-c-g)
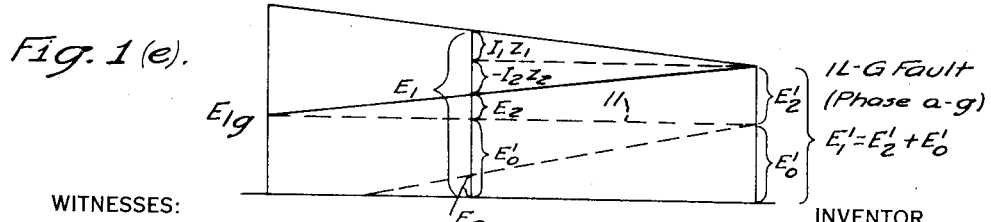
Fig. 1(e). 1L-G Fault (Phase a-g)
WITNESSES:
E. A. McCloskey
N. W. E. Groome
INVENTOR
Edwin L. Harder.
BY O. B. Buchanan
ATTORNEY Patented May 20, 1941

REISSUED

SEP 22 1942

2,242,951

UNITED STATES PATENT OFFICE 2,242,951

PROTECTIVE RELAYING EQUIPMENT

Edwin L. Harder, Forest Hills, Pa., assignor to Westinghouse Electric & Manufacturing Company, East Pittsburgh, Pa., a corporation of Pennsylvania Application November 12, 1938, Serial No. 239,916

19 Claims. (Cl. 175—294)

My invention relates to protective relaying equipment for three-phase electrical transmission lines or other electrical apparatus.

In recent times, considerable progress has been made in the replacement of moving contacts, in relaying circuits, by stationary networks which combine complicated electrical relations in a polyphase circuit, in order to produce a simple electrical quantity for operating a mechanically simple relay. These stationary networks have proven themselves to be beyond a doubt far more reliable than the use of several mechanical relays responsive separately to the several electrical quantities, and requiring high-speed coordinative action of their various contact-circuits.

One object of the present invention is the production of a single-element relaying device which is responsive to the distance of a fault from the relaying point, as measured along the transmission line, so as to respond to any one of a plurality of different kinds of faults.

A more specific object of my invention is to provide a combination of networks, with a single relaying device, utilizing the ratio of $(\bar{E}_1 - \bar{E}_2)$ to $(\bar{I}_1 - \bar{I}_2)$ as a very satisfactory, though not theoretically exact, single measure of the distance to the fault, where $E_1$ and $I_1$ represent the positive phase-sequence line-voltage and line-current, respectively, and $E_2$ and $I_2$ represent the negative phase-sequence line-voltage and line-current, respectively, the bars over the symbols indicating absolute quantities.

Further objects of my invention relate to various circuits and expedients for utilizing the above-mentioned arbitrary discriminating quantity or ratio, and in particular, circuits utilizing derived relaying voltages responsive to the vector values of the various phase-sequence quantities $I_1$, $I_2$, $E_1$ and $E_2$, in combination with rectifiers for obtaining the absolute values $\bar{I}_1$, $\bar{I}_2$, $\bar{E}_1$ and $\bar{E}_2$ of the respective phase-sequence quantities, and a relaying circuit in which the various rectified voltages are connected in series-circuit relation to each other.

Further objects of my invention relate to the utilization of a mechanically simple relay in connection with a coupling means which energizes the relay in response to the absolute value $\bar{I}_0$ of the zero phase-sequence component of the line-current. This absolute zero-sequence value is preferably obtained, as above indicated, with the aid of a rectifying device, and it may be utilized either separately or in combination with the response to the previously mentioned ratio, $(\bar{E}_1 - \bar{E}_2)$ to $(\bar{I}_1 - \bar{I}_2)$.

With the foregoing and other objects in view, my invention consists in the circuits, apparatus, systems, combinations and methods hereinafter described and claimed, and illustrated in the accompanying drawings, wherein:

Figure 1 (a) is a single-line diagrammatic view of a typical three-phase transmission system to which my invention is applicable;

Figs. 1 (b) to 1 (e) are voltage-diagrams illustrating the voltage-distribution along the line for different types of faults; and, Fig. 2 is a diagrammatic view of circuits and apparatus embodying my invention in a preferred form.

Fig. 1 (a) illustrates a transmission or distribution network which is sufficiently general, in character, to illustrate any power system to which my invention is applied. This system is symbolically represented by two sources 1 and 2, separated by a certain distance from each other and connected by line-sections 3, 4, 5, 6 and 7, with a parallel-connected line-section 8 illustrated as being connected in parallel to the line-sections 4, 5 and 6. The power system represented in Fig. 1 is assumed to be a three-phase system, the three phases being indicated by a single line, in accordance with a known convention. It is presumed that a fault occurs at the point marked X between the line-sections 5 and 6, and that the relaying station is at a circuit-breaker 9, at the junction between the line-sections 4 and 5, and disposed between the fault X and the source 1. It will be assumed that the positive, negative and zero phase-sequence line-currents $I_1$, $I_2$ and $I_0$ are positive when flowing from the relaying point 9 to the fault X, as indicated by the arrow in Fig. 1. It will be further assumed that the corresponding phase-sequence impedance-components of the line-section 5 between the relaying point 9 and the fault X are $Z_1$, $Z_2$ and $Z_0$.

In Fig. 1 (b), I consider the case of a three-phase fault, and I plot the distribution of the positive phase-sequence voltage $E_1$, from the source 1, where this voltage is indicated as $E_{1g}$, to the fault X, where the positive phase-sequence voltage is designated by a prime, as $E'_1$. In the case of a three-phase fault, there are no negative or zero-sequence currents or voltages. At the fault-point X, the positive-sequence voltage $E'_1$ is zero, neglecting fault-impedance as is customary for faults not involving ground. At the relaying point 9, the positive-sequence voltage is represented by the equation, $$E_1 = I_1 Z_1 \quad \text{_____(1)}$$

In the event of a three-phase fault, as indicated in the aforesaid Fig. 1 (b), as well as any other kind of fault, the positive-sequence line-impedance $Z_1$ is proportional to the distance to the fault, so that a measure of this impedance will be a measure of the fault-distance from the relaying point, giving the equation:

$$Z_1 = E_1/I_1 \quad\quad\quad\quad\quad (2)$$

In Fig. 1 (c), I consider the case of a line-to-line fault, designated L—L, on phase b—c, where phase-a is considered at the principal phase of reference of the symmetrical components. In this case, the positive-sequence voltage, starting with the value $E_{1g}$ at the source, dwindles along the line, until it reaches a certain value $E'_1$, at the fault, where it becomes, in effect, a source of negative-sequence voltage $E'_2$, so that $$E'_1 = E'_2 \quad\quad\quad\quad\quad (3)$$

The negative-sequence voltage starts with the value $E'_2$ at the fault and dwindles, as we move back along the line, from the fault-point to the point of no voltage of negative sequence.

For all static equipment having three-phase balance, the positive and negative phase-sequence impedances $Z_1$ and $Z_2$ are the same, and we have the relationship, $$Z_1 = Z_2 \quad\quad\quad\quad\quad (4)$$

In the well-known phase-sequence analysis of a line-to-line fault, the positive and negative phase-sequence impedance-networks are connected in series, so that we have the relationship, $$I_1 = -I_2 \quad\quad\quad\quad\quad (5)$$

In such a system, as represented by Fig. 1(c) and Equations 4 and 5, the point of no negative-sequence voltage would correspond to the point of maximum positive-sequence voltage, that is, the source $l$, while the positive and negative-sequence fault-point voltages $E'_1$ and $E'_2$ would each be one-half of the positive-sequence voltage $E_{1g}$ at the source.

From the relations shown in Fig. 1(c) for a line-to-line fault on phase b—c, it will be apparent that $$E_1 - E_2 = I_1 Z_1 - I_2 Z_2 \quad\quad\quad\quad\quad (6)$$

noting that the negative-sequence voltage-drop $-I_2 Z_2$ has the negative sign when measured from the fault-point X back to the relaying-point 9, because the currents are positive when measured from the relaying-point to the fault-point. Substituting from Equation 4, we have, $$Z_1 = (E_1 - E_2)/(I_1 - I_2) \quad\quad\quad\quad\quad (7)$$

Comparing Equations 7 and 2, it will be noted that Equation 7 is the more general, and that it also gives the correct value in case of a three-phase fault, in which case $E_2$ and $I_2$ are both zero.

In my discussion of a line-to-line fault, in connection with Fig. 1(c), it is to be noted that the relationships represented by this figure are applicable only to a fault on phase b—c, if phase-a is the reference-phase of the system of symmetrical coordinates. In this case, however, it follows, from Equations 4, 5 and 6, that the relaying-point phase-sequence voltages $E_1$ and $E_2$ are very nearly in phase with each other for any practical power-system. Thus, it would not make an appreciable difference, in consideration of the order of magnitude of the accuracy which is necessary for relaying purposes, if we modified Equation 7 by utilizing absolute values instead of vector values of the various relaying quantities, in order to obtain an indication of the distance of the fault from the relaying point. Indicating these absolute values by bars placed over the quantities in question, we now obtain a fault-distance indication of $$\bar{Z}_1 = (\bar{E}_1 - \bar{E}_2)/(\bar{I}_1 - \bar{I}_2) \quad\quad\quad\quad\quad (8)$$

If, now, we utilize the absolute values, as indicated in Equation 8, and if we should assume that the line-to-line fault is on any phase other than phase b—c, the phase-sequence currents and voltages $I_1$, $I_2$, $E_1$ and $E_2$ will be shifted by 120°, some forward and some backward, but their magnitudes or absolute values will remain unchanged, as compared to the values which were obtained when the fault was on phase b—c. It thus follows that Equation 8 is a sufficiently accurate measure of the fault-distance for a line-to-line fault, regardless of which phase is faulted.

In Fig. 1(d), I consider the case of a double line-to-ground fault, designated as 2L—G, assuming the fault to be on the phases b—c—g. In this case, the positive-sequence fault-voltage $E'_1$ becomes the source of voltage for both the negative-sequence fault-voltage $E'_2$ and the zero-sequence fault-voltage $E'_0$, the latter two voltages being connected in parallel with each other in the well-known equivalent phase-sequence diagram.

The voltage-distribution diagram for the double line-to-ground fault, as shown in Fig. 1(d), is identical with that for a line-to-line fault, as shown in Fig. 1(c), except for the addition of the zero-sequence voltage $E_0$, which is indicated in dotted lines in Fig. 1(d). This zero-sequence voltage starts with its maximum value $E'_0$ at the fault-point X, and reduces to zero at some point 10, which, in general, is different from the location of the source 1.

Since I utilize a relaying system which responds to only positive and negative-sequence quantities, according to Equation 8, the presence of a zero-sequence voltage $E_0$ and a zero-sequence current $I_0$ at the relaying point, in the case of double line-to-ground faults as shown in Fig. 1(d), will not have any effect upon the impedance-measurement, except that the zero-sequence impedance $Z_0$, which is in parallel with the negative-sequence impedance $Z_2$ in the well-known equivalent-impedance diagram, will, in general, cause $I_2$ and $E_2$ to be out of phase with $I_1$ and $E_1$, respectively, in the true distance-measuring Equation 7, causing Equation 8 to be very slightly inaccurate unless said phase-displacements reduce both the numerator and the denominator of Equation 7 in the same ratio.

In Fig. 1(e), I consider the case of a single line-to-ground fault, or what is commonly known simply as a ground-fault, designated at 1L—G. In this case the positive-sequence fault-voltage $E'_1$ becomes the source of the negative-sequence fault-voltage $E'_2$ and the zero-sequence fault-voltage $E'_0$, the latter two voltages being considered as being connected in series with each other, from the well-known equivalent phase-sequence diagram, so that $$E'_1 = E'_2 + E'_0 \quad\quad\quad\quad\quad (9)$$

In this case the base-line or X-axis for the negative-sequence voltage $E_2$ is displaced, by the value $E'_0$, from the principal X-axis, as indicated by the dotted line 11 in Fig. 1(e). From the relationships shown in Fig. 1(e), it is apparent that we have, $$E_1 - E_2 - E_0 = I_1 Z_1 - I_2 Z_2 \quad\quad\quad\quad\quad (10)$$

from which it follows that the apparent distance to which the relay responds is given by $$Z_1 = (E_1 - E_2 - E'_0)/(I_1 - I_2) \quad (11)$$

A comparison of Equation 11 with Equation 8 will show that a relay which is energized so as to have a balance-point as defined in Equation 8, will indicate too great a line-to-fault impedance $\bar{Z}_1$ if the fault is a single line-to-ground fault in which the actual line-to-fault impedance is as indicated in Equation 11. In other words, a relay energized in accordance with Equation 8 will measure too much impedance, by reason of its failure to respond to the zero-sequence fault-voltage $E'_0$. Another way of saying this, is that the relay will not reach out as far, in responding to single line-to-ground faults, or simply ground-faults, as in responding to any of the so-called phase-faults such as the three-phase faults, the line-to-line faults, and the double line-to-ground faults. An important thing to note about my relay, in accordance with Equation 8, is that it will not cause a faulty relaying operation by tripping too far, in the event of a ground-fault on the line.

Fig. 2 illustrates a specific form of embodiment of apparatus utilizing the principles of my invention. In this figure, the three-phase line-section 5 is indicated by three line-conductors $a$, $b$ and $c$, and the three-phase circuit breaker 9 is represented as having a trip-coil 13. Line-current transformers 14 supply currents to a positive-sequence network $I_1$ and to a network-sequence network $I_2$, for supplying relaying voltages which are responsive, respectively, to the positive-sequence line-current $I_1$ and to the negative-sequence line-current $I_2$.

The particular phase-sequence current-responsive networks $I_1$ and $I_2$, shown in Fig. 2, are similar to those which are described and claimed in a Lenehan application, Serial No. 187,510, filed January 28, 1938. These networks, as illustrated, each comprises two resistors $R$, connected in one of the phases, such as phase-$a$, and a three-coil mutual-impedance $j\sqrt{3}R$ having one coil connected in each of the phases $b$ and $c$ and having the third coil connected in the measuring circuit, or in series with the output-terminals of the network. Each network, as illustrated, also embodies two auxiliary current-transformers 15 and 16, connected in phases $b$ and $c$, respectively, for circulating an additional current $-(I_b+I_c)$ through one of the resistors $R$. The response of the measuring-circuit or output-circuit of such a current-responsive phase-sequence network is represented in the form of a voltage as follows:

$$E_m = \pm j\sqrt{3}R(I_b - I_c) + RI_a + R(I_a - I_b - I_c) \quad (12)$$

The value of the $\pm$ sign in front of the expression for the voltage-drop in the mutual-impedance device $j\sqrt{3}R$ depends upon the relative connections of the coils, as indicated by the polarity-marks $x$ in Fig. 2.

The positive-sequence current-responsive network $I_1$ has a response corresponding to the positive sign of the imaginary term of Equation 12, giving a generated output-voltage, $$E_m = 6RI_1 \quad (13)$$

The negative-sequence current-responsive network $I_2$ has a response corresponding to the negative sign of the imaginary term of Equation 12, producing a generated output-voltage, $$E_m = 6RI_2 \quad (14)$$

In Fig. 2, I also utilize a potential-transformer 20 for energizing positive and negative phase-sequence voltage-responsive networks $E_1$ and $E_2$, which may be of a conventional design.

For faults which are symmetrical with respect to phase-$a$, such as the faults represented in Figs. 1(b) to 1(e), the four phase-sequence networks $I_1$, $I_2$, $E_1$ and $E_2$, might simply be connected with proper polarities to form the relay operating quantity. However, for faults on other phases, the phase-angles would be incorrect to provide the same relay operating quantity for the same distance of the fault from the relay.

In order to obtain a response to the absolute values $\bar{I}_1$, $\bar{I}_2$, $\bar{E}_1$ and $\bar{E}_2$ of the phase-sequence quantities, I have shown a plurality of rectifier-bridges 23, 24, 25 and 26 associated with the respective phase-sequence networks $I_1$, $I_2$, $E_1$ and $E_2$, and the output-diagonals of these rectifier-bridges are illustrated as being connected in series with each other, in a relaying circuit 27, to produce a relaying voltage according to the equation, $$E_r = \bar{I}_1 - \bar{I}_2 - \bar{E}_1 + \bar{E}_2 \quad (15)$$

It will be noted that the voltages corresponding to $\bar{I}_2$ and $\bar{E}_1$ are reversed, with respect to the voltages corresponding to $\bar{I}_1$ and $\bar{E}_2$, in order to obtain a balance-point, corresponding to $E_r=0$, which is the same as is obtained in Equation 8 by placing $\bar{Z}_1=1$.

The rectifier-bridges 23, 24, 25 and 26 are preferably made up of asymmetrically conducting rectifiers, which might be copper-oxide rectifiers or any equivalent rectifiers.

It will be noted that the rectifier-elements in the bridges 24 and 25, responding to $\bar{I}_2$ and $\bar{E}_1$, respectively, are directed so as to oppose the positive flow of current in response to the voltage-outputs of the other two rectifier-bridges 23 and 26. If the reverse-current impedances of the rectifier-bridges 24 and 25 are inconveniently large, these bridges may be shunted by impedances 28 and 29, respectively, so as to produce a voltage-drop of the proper amount, when current is flowing in the relaying circuit in the positive direction as determined by the other two rectifier-bridges 23 and 26.

The relaying circuit 27, which responds according to Equation 15, is utilized to energize a direct-current relay 30 having a contact-member 31 which is utilized to control the energization of the tripping coil 13 of the circuit-breaker 9. This relay 30 may advantageously be of the polarized type, as shown, so as to obtain an operating force which varies as the first power of the impressed relaying voltage $E_r$, rather than varying as the square of the impressed voltage, as in other types of relays. The first-power response minimizes the departure of the operating point from the theoretically correct balance-point of the relay, the operating point being the actual line-circuit conditions at which the relaying-voltage $E_r$ becomes large enough to overcome the restraint of the biasing spring 32 of the relay.

It will be noted that the rectifier-bridges 23 and 26 produce current in a direction tending to cause an operative response of the polarized relay 30, tending to move its contact-member 31 from its normal biased position to its tripping position. On the other hand, the voltages generated in the rectifier-bridges 24 and 25 tend to send current in the reverse direction, in the relaying circuit 27, thus tending to restrain the operation of the polarized relay 30, or to hold its contact-member 31 more strongly in its normal biased position.

If desired, the relaying circuit 27 may be provided with an additional rectifying means, 33, for interposing an additional impediment against current-flow in the negative or relay-restraining direction.

The rectifying-means 24 and 25, which are associated with the phase-sequence filters $I_2$ and $E_1$ are preferably of the full-wave type, and are preferably provided with direct-current filters, symbolized by capacitors 34 and 35, connected across the output-terminals thereof, so as to smooth out the rectified voltage-wave to any desired extent, depending upon the necessary speed of relay-response and the necessary accuracy of the fault-distance measuring-operation. As a matter of convenience or expediency, I prefer to utilize similar full-wave rectifying-means, with similarly filtered outputs, for the other two rectifier-bridges 23 and 26, but these precautions are the most needed in connection with the two rectifier-bridges 24 and 25 which produce restraining voltages. If these restraining voltages were not substantially smooth-topped voltage-waves, the peaks in these voltages would vary in phase position according to the phase on which the fault occurred on the protected line-section 5, and if the wave-forms of the relay-operating voltages produced in the rectifiers 23 and 26 were similarly peaked, the peaks would not always coincide to produce an accurate relaying response.

The outputs of the two current-responsive phase-sequence networks $I_1$ and $I_2$ are also preferably associated with voltage-limiting means, such as a saturable transformer or reactance-device 37, and a space-discharge device such as a neon, or other gas-filled lamp 38, as described and claimed in a Bostwick application, Serial No. 182,980, filed January 3, 1938. The effect of these voltage-limiting devices 37 and 38 is to produce a limited voltage of more nearly sinusoidal waveform than could be obtained with either device 37 or 38 alone, and this limited voltage is of a value higher than the relay operating-point, so that the voltage-limiting means 37 and 38 do not have any appreciable effect upon the balance-point of the relay 30. For faults which are closer to the relaying point than the balance-point at which the relay 30 just barely operates, the line-currents may be much larger, and the voltage-limiting means 37 and 38 then come into play to limit the maximum voltage or current which has to be handled both by the rectifying-means 23 and 24, and by the operating coil of the relay 30.

The voltage-filters $E_1$ and $E_2$ have definite maximum outputs, as distinguished from the very large maximum outputs which are possible in the case of the current-responsive filters $I_1$ and $I_2$, and hence these voltage-filters $E_1$ and $E_2$ will generally not require such limiting devices as the saturable transformer 37 and the neon lamp 38, although obviously they may be added, in certain situations where they may be advantageous.

It will be understood that the magnitudes of the voltage-outputs of the four rectifier-bridges 23, 24, 25 and 26, as expressed in Equation 15, may be adjusted by any convenient means, in order to adjust the balance-point and operating conditions of the relay 30.

In operation, if the fault on the transmission line is at any location between the relaying station, or circuit-breaker station 9, and the balance-point of the relay, corresponding to Equation 8 or 15, the net current-responsive relaying-voltages ($\bar{I}_1 - \bar{I}_2$) will be in excess of the net voltage-responsive relaying-voltages ($\bar{E}_1 - \bar{E}_2$), and the right-hand side of Equation 15 will be greater than zero, with a resultant current-flow through the relay 30 in a relay-operating direction, producing a tripping-operation of the circuit-breaker 9, or producing any other desired control-action. For all faults beyond the relay balance-point, the relay-restraining voltages will predominate, tending to send current through the polarized relay 30 in the restraining direction. This current in the restraining direction will be strictly limited, however, by reason of the asymmetrically conducting properties of the rectifiers 23, 26 and 33 in the relaying circuit 27.

This relaying combination or system can be made fast in its operation, having a maximum operating time (at the balance-point) well under one cycle, assuming a 60-cycle line 5. The operating time of the relay is much faster for faults which are "close in," or adjacent to the relaying point 9. Furthermore, my relaying system produces a relay-operating force which is fairly steady throughout a cycle of the line-frequency current, a feature wherein it differs from previous fault-detecting arrangements which have given an indication, of the proper ratio, only at certain periods during the line-frequency cycle.

As previously pointed out, my relaying system provides very nearly the same measurement of distance from the relaying point to the fault, for any type of phase-fault, including three-phase faults, line-to-line faults, and double line-to-ground faults, and it "reaches" a shorter distance for ground-faults, which is another way of saying that it does not respond to ground-faults at or beyond the normal balance-point for phase-faults.

It is possible to add means, in addition to the relaying circuit 27, for causing the polarized relay 30 to respond to ground-faults at the same distance as the balance-point for phase-faults, or at any other desired ground-fault balance-point. To this end, I show, in Fig. 2, a switch 41 in the residual-current portion of the output circuit of the current-transformers 14, and I shunt this switch 41 with a resistor 42, so that, when the switch 41 is open, a voltage-drop is produced in the resistance 42, proportional to the value of the residual current $(I_a + I_b + I_c) = 3I_0$. The $I_0$ voltage-drop in the resistor 42 is applied, through a voltage-limiting device 37' and 38', to a rectifier-bridge 43; the output-circuit 47 of which is connected in parallel-circuit relation to the phase-fault-responsive relaying-circuit 27, so that the operating coil of the polarized relay 30 is impressed with an operating voltage from either one of the two relaying circuits 27 and 47, whichever voltage is the higher. The asymmetrically conducting properties of the rectifiers 23, 26, 33 and 43 prevent the two parallel-connected relaying circuits 27 and 47 from short-circuiting each other, so that the result of these two circuits is a direct-current relaying-voltage corresponding to the maximum voltage which is produced in either one of the two circuits 27 and 47.

The relay circuit 47, which is responsive to the absolute value of the zero phase-sequence component of the line-current, produces a voltage $k\bar{I}_0$, thus making the polarized relay 30 a ground-fault overcurrent relay, the setting of which may be altered by properly controlling the factor $k$. It will be understood that, when both relaying circuits 27 and 47 are in operation, the relay 30 becomes a combined phase-impedance and ground-overcurrent relay of separately adjustable setting for phase-faults and for ground-faults, respectively.

While I have illustrated my invention in a single preferred form of embodiment, it will be obvious that many changes may be made by those skilled in the art, without departing from the essential principles of my invention. I desire, therefore, that the appended claims shall be accorded the broadest construction consistent with their language and the prior art.

I claim as my invention:

1. Protective relaying equipment for a three-phase electrical apparatus, comprising means including rectifier-means, for deriving a first direct-current relay quantity selectively responsive to the absolute value of the positive phase-sequence current-component of the current in said apparatus, means including rectifier-means, for deriving a second direct-current relaying quantity selectively responsive to the absolute value of the negative phase-sequence current-component of the current in said apparatus, and relay-means responsive, in some measure, to the difference between said first and second direct-current relaying quantities.

2. Protective relaying equipment for a three-phase electrical apparatus, comprising means for deriving a first relaying quantity $\bar{I}_1$ selectively responsive to the absolute value of the positive phase-sequence current-component of the current in said apparatus, means for deriving a second relaying quantity $\bar{I}_2$ selectively responsive to the absolute value of the negative phase-sequence current-component of the current in said apparatus, means for deriving a third relaying quantity $\bar{E}_1$ selectively responsive to the absolute value of the positive phase-sequence voltage-component of the voltage on said apparatus, means for deriving a fourth relaying quantity $\bar{E}_2$ selectively responsive to the absolute value of the negative phase-sequence voltage-component of the voltage on said apparatus, and relay-means responsive, in some measure, to the ratio of $(\bar{I}_1-\bar{I}_2)$ to $(\bar{E}_1-\bar{E}_2)$.

3. Protective relaying equipment for a three-phase electrical apparatus, comprising means for deriving a first relaying quantity $\bar{I}_1$ selectively responsive to the absolute value of the positive phase-sequence current-component of the current in said apparatus, means for deriving a second relaying quantity $\bar{I}_2$ selectively responsive to the absolute value of the negative phase-sequence current-component of the current in said apparatus, means for deriving a third relaying quantity $\bar{E}_1$ selectively responsive to the absolute value of the positive phase-sequence voltage-component of the voltage on said apparatus, means for deriving a fourth relaying quantity $\bar{E}_2$ selectively responsive to the absolute value of the negative phase-sequence voltage-component of the voltage on said apparatus, and relay-means utilizing the quantities $\bar{I}_1$ and $\bar{E}_2$ to operate the relay and utilizing the quantities $\bar{I}_2$ and $\bar{E}_1$ to restrain the relay.

4. Protective relaying equipment for a three-phase electrical apparatus, comprising means for deriving a first relaying voltage $I_1$ selectively responsive to the vector value of the positive phase-sequence current-component of the current in said apparatus, means for deriving a second relaying voltage $I_2$ selectively responsive to the vector value of the negative phase-sequence current-component of the current in said apparatus, rectifier-means for deriving a rectified voltage $\bar{I}_1$ from the voltage $I_1$, rectifier-means for deriving an approximately smooth-wave rectified voltage $\bar{I}_2$ from the voltage $I_2$, and relay-means responsive, in some measure, to the difference between said rectified voltages $\bar{I}_1$ and $\bar{I}_2$.

5. Protective relaying equipment for a three-phase electrical apparatus, comprising means for deriving a first relaying voltage $I_1$ selectively responsive to the vector value of the positive phase-sequence current-component of the current in said apparatus, means for deriving a second relaying voltage $I_2$ selectively responsive to the vector value of the negative phase-sequence current-component of the current in said apparatus, means for deriving a third relaying voltage $E_1$ selectively responsive to the vector value of the positive phase-sequence voltage-component of the voltage on said apparatus, means for deriving a fourth relaying voltage $E_2$ selectively responsive to the vector value of the negative phase-sequence voltage component of the voltage on said apparatus, rectifier-means for deriving a rectified voltage $\bar{I}_1$ from the voltage $I_1$, rectifier-means for deriving an approximately smooth-wave rectified voltage $\bar{I}_2$ from the voltage $I_2$, rectifier-means for deriving an approximately smooth-wave rectified voltage $\bar{E}_1$ from the voltage $E_1$, rectifier-means for deriving a rectified voltage $\bar{E}_2$ from the voltage $E_2$, and relay-means responsive, in some measure, to the ratio of $(\bar{I}_1-\bar{I}_2)$ to $(\bar{E}_1-\bar{E}_2)$.

6. Protective relaying equipment for a three-phase electrical apparatus, comprising means for deriving a first relaying voltage $I_1$ selectively responsive to the vector value of the positive phase-sequence current-component of the current in said apparatus, means for deriving a second relaying voltage $I_2$ selectively responsive to the vector value of the negative phase-sequence current-component of the current in said apparatus, means for deriving a third relaying voltage $E_1$ selectively responsive to the vector value of the positive phase-sequence voltage-component of the voltage on said apparatus, means for deriving a fourth relaying voltage $E_2$ selectively responsive to the vector value of the negative phase-sequence voltage component of the voltage on said apparatus, rectifier-means for deriving a rectified voltage $\bar{I}_1$ from the voltage $I_1$, rectifier-means for deriving an approximately smooth-wave rectified voltage $\bar{I}_2$ from the voltage $I_2$, rectifier-means for deriving an approximately smooth-wave rectified voltage $\bar{E}_1$ from the voltage $E_1$, rectifier-means for deriving a rectified voltage $\bar{E}_2$ from the voltage $E_2$, and relay-means utilizing the quantities $\bar{I}_1$ and $\bar{E}_2$ to operate the relay and utilizing the quantities $\bar{I}_2$ and $\bar{E}_1$ to restrain the relay.

7. Protective relaying equipment for a three-phase electrical apparatus, comprising means for deriving a first relaying voltage $I_1$ selectively responsive to the vector value of the positive phase-sequence current-component of the current in said apparatus, means for deriving a second relaying voltage $I_2$ selectively responsive to the vector value of the negative phase-sequence current-component of the current in said apparatus, means for deriving a third relaying voltage $E_1$ selectively responsive to the vector value of the positive phase-sequence voltage-component of the voltage on said apparatus, means for deriving a fourth relaying voltage $E_2$ selectively responsive to the vector value of the negative phase-sequence voltage component of the voltage on said apparatus, rectifier-means for deriving a rectified voltage $\bar{I}_1$ from the voltage $I_1$, rectifier-means for deriving an approximately smooth-wave rectified voltage $\bar{I}_2$ from the voltage $I_2$, rectifier-means for deriving an approximately smooth-wave rectified voltage $\bar{E}_1$ from the voltage $E_1$, rectifier-means for deriving a rectified voltage $\bar{E}_2$ from the voltage $E_2$, a direct-current relay, and electrical energizing-means for said direct-current relay, said electrical energizing-means comprising an electrical energizing-circuit including said four voltages $\bar{I}_1$, $\bar{I}_2$, $\bar{E}_1$ and $\bar{E}_2$ in series-circuit relation to each other, with the voltages $\bar{I}_2$ and $\bar{E}_1$ reversed with respect to the voltages $\bar{I}_1$ and $\bar{E}_2$.

8. Protective relaying equipment for a three-phase electrical apparatus, comprising means for deriving a first relaying voltage $I_1$ selectively responsive to the vector value of the positive phase-sequence current-component of the current in said apparatus, means for deriving a second relaying voltage $I_2$ selectively responsive to the vector value of the negative phase-sequence current-component of the current in said apparatus, means for deriving a third relaying voltage $E_1$ selectively responsive to the vector value of the positive phase-sequence voltage-component of the voltage on said apparatus, means for deriving a fourth relaying voltage $E_2$ selectively responsive to the vector value of the negative phase-sequence voltage component of the voltage on said apparatus, means for deriving a fifth relaying voltage $I_0$ selectively responsive to the vector value of the residual current in said apparatus, asymmetrically conducting rectifier-means for deriving a rectified voltage $\bar{I}_1$ from the voltage $I_1$, asymmetrically conducting rectifier-means for deriving an approximately smooth-wave rectifier voltage $\bar{I}_2$ from the voltage $I_2$, asymmetrically conducting rectifier-means for deriving an approximately smooth-wave rectified voltage $\bar{E}_1$ from the voltage $E_1$, asymmetrically conducting rectifier-means for deriving a rectified voltage $\bar{E}_2$ from the voltage $E_2$, asymmetrically conducting rectifier-means for deriving a rectified voltage $\bar{I}_0$ from the voltage $I_0$, a direct-current relay, and electrical energizing means for said direct-current relay, said electrical energizing-means comprising two electrical energizing-circuits connected in parallel-circuit relation to each other, one of said electrical energizing-circuits including said four voltages $\bar{I}_1$, $\bar{I}_2$, $\bar{E}_1$ and $\bar{E}_2$ in series-circuit relation to each other, with the voltages $\bar{I}_2$ and $\bar{E}_1$ reversed with respect to the voltages $\bar{I}_1$ and $\bar{E}_2$, and the other of said electrical energizing-circuits including said rectified voltage $\bar{I}_0$.

9. The invention as defined in claim 4, characterized by said rectifier-means which are associated with the relaying voltages $I_1$ and $I_2$ comprising means for limiting the maximum values of the rectified voltages $\bar{I}_1$ and $\bar{I}_2$ to values corresponding to faults closer than the pick-up point of the relay.

10. The invention as defined in claim 5, characterized by said rectifier-means which are associated with the relaying voltages $I_1$ and $I_2$ comprising means for limiting the maximum values of the rectified voltages $\bar{I}_1$ and $\bar{I}_2$ to values corresponding to faults closer than the pick-up point of the relay.

11. The invention as defined in claim 6, characterized by said rectifier-means which are associated with the relaying voltages $I_1$ and $I_2$ comprising means for limiting the maximum values of the rectified voltages $\bar{I}_1$ and $\bar{I}_2$ to values corresponding to faults closer than the pick-up point of the relay.

12. The invention as defined in claim 7, characterized by said rectifier-means which are associated with the relaying voltages $I_1$ and $I_2$ comprising means for limiting the maximum values of the rectified voltages $\bar{I}_1$ and $\bar{I}_2$ to values corresponding to faults closer than the pick-up point of the relay.

13. The invention as defined in claim 8, characterized by said rectifier-means which are associated with the relay voltages $I_1$, $I_2$ and $I_0$ comprising means for limiting the maximum values to the rectified voltages $\bar{I}_1$, $\bar{I}_2$ and $\bar{I}_0$ to values corresponding to faults closer than the pick-up point of the relay.

14. The invention as defined in claim 7, characterized by said electrical energizing-circuit including impedance-means shunting the voltages $\bar{I}_2$ and $\bar{E}_1$, respectively.

15. The invention as defined in claim 8, characterized by the first-mentioned one of said electrical energizing-circuits including impedance-means shunting the voltages $\bar{I}_2$ and $\bar{E}_1$, respectively.

16. Protective relaying equipment for a polyphase electrical apparatus, comprising current-responsive relaying-means for deriving an alternating-current relay-quantity which is selectively responsive to a residual current in said protected apparatus, rectifier-means associated with said current-responsive relaying-means for deriving a direct-current relaying-quantity which is selectively responsive to the absolute value of the residual current in said apparatus, and a discriminatory fault-detecting direct-current relaying-means associated with said rectifier-means so as to be responsive, in some manner, to the attainment of a predetermined absolute magnitude of a unidirectional electrical output-quantity of said rectifier-means for affording a selective response to a predetermined fault-condition involving a predetermined residual current in said apparatus, said rectifier-means comprising means for limiting the maximum value of said unidirectional electrical output-quantity after it has attained a value larger than the pick-up point of said discriminatory fault-detecting direct-current relaying-means.

17. Protective relaying equipment for a three-phase electrical apparatus, comprising phase-sequence-responsive means for obtaining a unidirectional selective responsive to the absolute value of the positive phase-sequence current-component of the current in said apparatus substantially regardless of the time-phase or reversals of the alternating-current half-waves of opposite directions of current-flow of the alternating vector or wave-form of said positive phase-sequence current-component, phase-sequence-responsive means for obtaining a unidirectional selective response to the absolute value of the negative phase-sequence current-component of the current in said apparatus substantially regardless of the time-phase or reversals of the alternating-current half-waves of opposite directions of current-flow of the alternating vector or waveform of said negative phase-sequence current-component, and totalizing relaying-means responsive, in some measure, to both of said unidirectional selective responses.

18. Protective relaying equipment for a three-phase electrical apparatus, comprising means, including rectifier-means, for deriving a first direct-current relaying-quantity selectively responsive to the absolute value of the positive phase-sequence current-component of the current in said apparatus, means, including rectifier-means, for deriving a second direct-current relaying-quantity selectively responsive to the absolute value of the negative phase-sequence current-component of the current in said apparatus, circuit-means serially including both of said direct-current relaying-quantities, and a direct-current relaying-means energized from said circuit-means.

19. Protective relaying equipment for a polyphase electrical apparatus, comprising a first electro-responsive relaying-means for deriving an alternating-current relaying-quantity which is selectively responsive, in some manner, to a predetermined electrical-quantity-function of said protected apparatus for responding, in some manner, to a predetermined kind of fault in said protected apparatus, a second electro-responsive relaying-means for deriving an alternating-current relaying-quantity which is selectively responsive, in some manner, to another predetermined electrical-quantity-function of said protected apparatus for responding, in some manner, to a different predetermined kind of fault in said protected apparatus, a rectifier-means associated with each of said current-responsive relaying-means each deriving a direct-current relaying-quantity which is selectively responsive, in some manner, to the absolute value of the alternating-current relaying-quantity derived by its associated electro-responsive relaying-means, circuit-means including both of said direct-current relaying-quantities in series-circuit relation to each other, and a discriminatory fault-detecting direct-current relaying-means energized from said circuit-means for detecting the attainment of a predetermined absolute magnitude in an electrical quantity of said circuit-means.

EDWIN L. HARDER.